(12) United States Patent
Ho

(10) Patent No.: US 10,394,053 B2
(45) Date of Patent: Aug. 27, 2019

(54) DISPLAYED IMAGE-OPTIMIZED LENS

(71) Applicant: Patrick C. Ho, Hilton, NY (US)

(72) Inventor: Patrick C. Ho, Hilton, NY (US)

(73) Assignee: Patrick C Ho, Hilton, NY (US)

( * ) Notice: Subject to any disclaimer, the term of this patent is extended or adjusted under 35 U.S.C. 154(b) by 0 days.

(21) Appl. No.: 14/168,769

(22) Filed: Jan. 30, 2014

(65) Prior Publication Data

US 2015/0185500 A1 Jul. 2, 2015

Related U.S. Application Data

(60) Provisional application No. 61/922,495, filed on Dec. 31, 2013.

(51) Int. Cl.
*G02C 7/06* (2006.01)
*G02C 7/08* (2006.01)
*G02B 27/01* (2006.01)

(52) U.S. Cl.
CPC .......... *G02C 7/06* (2013.01); *G02B 27/0172* (2013.01); *G02C 7/066* (2013.01); *G02C 7/086* (2013.01)

(58) Field of Classification Search
CPC .......... G02C 7/06; G02C 7/066; G02C 7/086; G02B 27/0172
USPC ............................ 351/54, 84, 159.01–159.81
See application file for complete search history.

(56) References Cited

U.S. PATENT DOCUMENTS

| 6,369 | A | * | 4/1849 | Hotchkiss et al. ........ 351/159.41 |
| 772,196 | A | * | 10/1904 | Ward ....................... G02C 7/06 2/446 |
| 1,085,522 | A | | 1/1914 | Baker |
| 1,427,192 | A | * | 8/1922 | Bugbee ..................... G02C 7/06 351/159.43 |
| 1,585,489 | A | | 5/1926 | Hailman |
| 3,752,566 | A | * | 8/1973 | Mathews .................... 351/204 |
| 4,753,514 | A | * | 6/1988 | Kubik ....................... G02C 9/04 351/158 |
| 4,781,452 | A | * | 11/1988 | Ace ........................ 351/159.74 |
| 4,861,153 | A | | 8/1989 | Winthrop |
| 4,948,244 | A | | 8/1990 | Jones |
| 5,118,178 | A | * | 6/1992 | Tuckman ....................... 351/57 |
| 5,790,226 | A | | 8/1998 | Pollak |
| 5,867,246 | A | | 2/1999 | Edwards et al. |

(Continued)

FOREIGN PATENT DOCUMENTS

| KR | 10-2006-0095700 A | 9/2006 |
| WO | WO0055676 A1 | 9/2000 |

OTHER PUBLICATIONS

Printout of http://optical.cvs.com/How-to-Read-Your-Eyeglass-Prescription-c172.html, 2011.*

(Continued)

*Primary Examiner* — George G King
(74) *Attorney, Agent, or Firm* — Brown & Michaels, PC

(57) ABSTRACT

A pair of prescription lenses adapted for use with a near-to-eye display, includes a first lens power region adjusted to a focal distance to focus an image displayed by the near-to-eye display and a second lens power region adjusted to a focal distance substantially the same as the focal distance of the first power region; eyeglasses containing the lens pair; and a method for optimizing the visual acuity of a wearer of prescription eyeglasses when observing an image generated by a near-to-eye display.

20 Claims, 2 Drawing Sheets

(56) References Cited

U.S. PATENT DOCUMENTS

| | | | |
|---|---|---|---|
| 6,023,372 A * | 2/2000 | Spitzer | G02B 27/017 345/8 |
| 6,027,214 A | 2/2000 | Graham | |
| 6,199,983 B1 | 3/2001 | Kato et al. | |
| 6,685,316 B2 | 2/2004 | Baumbach et al. | |
| 6,697,200 B2 * | 2/2004 | Nagaoka | G02B 27/0172 359/630 |
| 6,860,599 B2 | 3/2005 | Fuschi | |
| 7,436,568 B1 * | 10/2008 | Kuykendall, Jr. | G02B 27/0172 359/245 |
| 7,484,842 B2 | 2/2009 | Brzozowski | |
| 7,507,358 B2 | 3/2009 | Morris et al. | |
| 7,828,428 B1 * | 11/2010 | Livingston | G02C 5/005 351/159.67 |
| 8,576,143 B1 | 11/2013 | Kelly | |
| 2003/0060881 A1 | 3/2003 | Glick et al. | |
| 2003/0142265 A1 | 7/2003 | Fresco | |
| 2004/0008320 A1 | 1/2004 | Shirayanagi | |
| 2006/0103806 A1 | 5/2006 | Torrey | |
| 2007/0268451 A1 | 11/2007 | Raghuprasad | |
| 2009/0251661 A1 | 10/2009 | Fuziak | |
| 2010/0110368 A1 | 5/2010 | Chaum | |
| 2010/0171922 A1 | 7/2010 | Sessner et al. | |
| 2011/0029073 A1 * | 2/2011 | Liang | A61F 2/147 623/5.11 |
| 2012/0057124 A1 * | 3/2012 | Spivey | G02C 7/02 351/178 |
| 2012/0086910 A1 * | 4/2012 | Kato et al. | 351/168 |
| 2012/0147317 A1 | 6/2012 | Loeb et al. | |
| 2014/0211146 A1 * | 7/2014 | Gupta | G02B 3/12 351/158 |

OTHER PUBLICATIONS

International Search Report and Written Opinion in correspondence application No. PCT/US2014/013897 dated Sep. 30, 2014.

Heiting, Gary, Bifocals & Trifocals: Solutions for "Short Arms", http://www.allaboutvision.com/lenses/multifocal.htm, Oct. 2013.

Supplemental European Search Report in corresponding European application EP14799949, dated Sep. 18, 2015.

\* cited by examiner

US 10,394,053 B2

DISPLAYED IMAGE-OPTIMIZED LENS

CROSS REFERENCE

This application claims the benefit of U.S. Provisional Patent Application Ser. No. 61/922,495, filed Dec. 31, 2013, the contents of which are hereby incorporated by reference in its entirety.

FIELD

The present invention relates generally to a pair of prescription eyeglass lenses, and more particularly to a pair of displayed image-optimized prescription eyeglass lenses used in conjunction with a near-to-eye display device, eyeglasses containing such prescription lenses, and methods relating to improving visual acuity when using such display devices.

BACKGROUND

Current lens designs, conventional or digital, are primarily used for distance vision and for near vision in cases of multi-focal and progressive lenses. For lens intended to be used in conjunction with a visualization device which displays images, such as a heads-up display, retinal projector, or other near-to-eye system, the visualization element is often mounted on or near a corner of the lens and is thus closely located to the wearer's pupil. The location of the visualization element, therefore, forces the wearer to gaze in a direction to see the image generated. Normal prescription lenses are not designed to optimize the visual acuity of the image displayed in those very near gaze directions, which results in a blurring of the image display, and visual fatigue as the eye tries to compensate for the movement to a less clear viewing area. Accordingly, there is a need for a lens designed for use in combination with a near-to-eye display device that removes unwanted aberrations perceived by the wearer in the direction of sight associated with the device providing the wearer a clear vision of the displayed image, as well as the normal clear vision their lenses provide of the world around them. The elimination of aberrations and the enhancement of visual acuity reduce headaches, eye strain and fatigue that may be caused by extended use of a near-to-eye display in combination with prescription glasses having typical prescription lenses.

SUMMARY

It is an aspect of the invention to provide prescription lenses and eyeglasses containing such lenses that can be used in conjunction with a near-to-eye display, such as a heads-up display and/or a retinal projector, also known as a virtual retinal display.

It is another aspect of the invention to provide prescription lenses with optimized visual acuity in the region of the lens used by the wearer to observe an image from a near-to-eye display, such as a heads-up display and/or retinal projector.

It is a further aspect of the invention to optimize use of a near-to-eye display, such as a heads-up display and/or retinal projector while preventing visual fatigue and other unwanted side effects.

In accordance with an aspect of the present invention there is provided an eyeglass device including a support member; a first lens supported by the support member, the first lens including a near-to-eye display visualization region; and a second lens supported by the support member, the second lens including a visual acuity optimization region, wherein the region of the first lens and the region of the second lens are located in substantially the same region of the first and second lens, respectively.

In accordance with an aspect of the present invention there is provided an eyeglass device including a support member; a first lens supported by the support member, the first lens including a near-to-eye display visualization region in an upper outside quadrant of the first lens; and a second lens supported by the support member, the second lens including a visual acuity optimization region in an upper inside quadrant of the second lens.

In accordance with an aspect of the present invention there is provided an eyeglass device including a support member; a first lens supported by the support member, the first lens including a first power region, wherein the power of the first power region is adjusted to a focal distance to focus an image displayed by a near-to-eye display; and a second lens supported by the support member, the second lens including a second power region, wherein the power of the second power region is adjusted to a focal distance substantially the same as the focal distance of the first power.

In accordance with an aspect of the present invention there is provided an eyeglass device configured for use with a near-to-eye display, the device including a support member; a first lens supported by the support member, the first lens including a first power region, wherein the power of the first power region is adjusted to a focal distance to focus an image displayed by the near-to-eye display; and a second lens supported by the support member, the second lens including a second power region, wherein the power of the second power region is adjusted to a focal distance substantially the same as the focal distance of the first power, wherein the first power region of the first lens and the second power region of the second lens are located in substantially the same region of the first and second lens, respectively.

In accordance with another aspect of the present invention there is provided a method for optimizing the visual acuity of a wearer of prescription eyeglasses when observing an image generated by a near-to-eye display, including providing an eyeglass device configured for use with the near-to-eye display, the device including a support member; a first lens supported by the support member, the first lens including a first power region, and a second lens supported by the support member, the second lens including a second power region; adjusting the power of the first power region to a focal distance to focus an image displayed by the near-to-eye display; adjusting the power of the second power region to a focal distance substantially the same as the focal distance of the first power.

In accordance with another aspect of the present invention there is provided a pair of prescription lenses adapted for use with a near-to-eye display, the pair of lenses including a first lens including a first power region, wherein the power of the first power region is adjusted to a focal distance to focus an image displayed by the near-to-eye display; and a second lens including a second power region, wherein the power of the second power region is adjusted to a focal distance substantially the same as the focal distance of the first power.

In accordance with another aspect of the present invention there is provided an eyeglass device configured for use with a near-to-eye display, the device including a support member; a first lens supported by the support member, the first lens including a first display region having a first power and a second display region having a second power; and a second lens supported by the support member, the second lens including a third display region having a third power and a fourth display region having a fourth power; wherein the first display region of the first lens and the third display region of the second lens are located in substantially the same region of the first and second lens and the second display region of the first lens and the fourth display region of the second lens are located in substantially the same region of the first and second lens, respectively, and wherein the first power and the third power and the second power and the fourth power are configured to provide a wearer with substantially similar visual acuity in the respective display regions of the first and second lens.

These and other aspects of the present invention are provided by inventive methods and apparatuses for optimizing the visual acuity in the region of an eyeglass lens that is used to observe a near-to-eye display generated image.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 5:
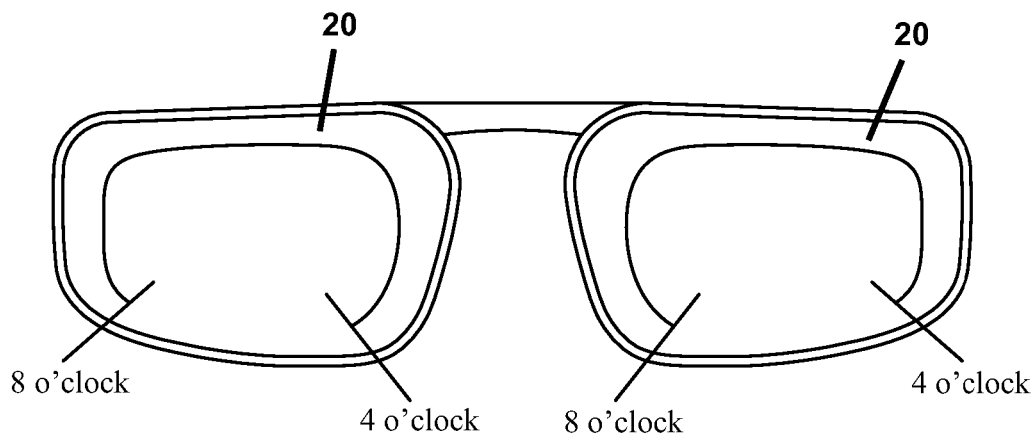
Figure 6:
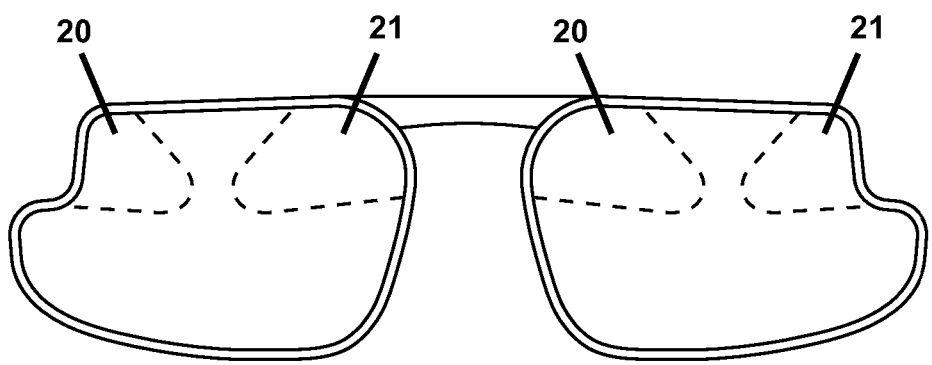

FIG. 5 is a front view illustrating a lens support with a first and second lens having a focal region within a position about the perimeter of the lens from the 8 o'clock position clockwise through the 4 o'clock position according to an embodiment of the present invention; and FIG. 6 is a front view illustrating a lens support with a first and second lens each having a first focal region in an upper left quadrant and a second focal region in an upper right quadrant according to an embodiment of the present invention.

DETAILED DESCRIPTION

The present disclosure is directed to inventive methods and apparatus relating to displayed image-optimized prescription eyeglass lenses used in conjunction with a near-to-eye display, eyeglasses containing such displayed image-optimized prescription lenses, and methods relating to improving visual acuity when using such display devices. As used herein, near-to-eye display means a display, device, or system, such as a retinal projector, virtual retinal display, visualization element, head-mounted display, heads-up display, or other near-to-eye system, typically worn on the head of a user that generates an image near the eye. The display device is often mounted adjacent an edge of the wearer's eye and is thus closely located to the wearer's pupil. The location of the display, therefore, forces the wearer to gaze in a direction to view the image generated by the display. Typically positioned near the user's eye, the display is aligned to the user's field of view to allow review of the displayed information with little or no head movement. This enables the user to view the display while interacting with the surrounding environment.

In a preferred embodiment, in the displayed image-optimized prescription lens of the present invention includes a focal region in the same region of each lens of a pair of lens members. The shape and location of this focal region depends at least in part on the location of the near-to-eye display, as well as the wearer's pupillary distance ("PD"). For example, for a monocular display located at least partially over the upper right corner of the wearer's right lens, both the right lens and the left lens will include a focal region in the upper right corner of the lenses, which is designed to optimize visual acuity for viewing the displayed image generated by the near-to-eye display device. For a monocular near-to-eye display located at least partially over the upper left corner of the wearer's left lens, both the left lens and the right lens will include a focal region in the upper left corner of the lenses, which is designed to optimize visual acuity for viewing the displayed image generated by the near-to-eye display device. Similarly, for a binocular display device located at least partially over both of the wearer's lenses, both the left lens and the right lens will include focal regions in the image display region of the lenses which is designed to optimize visual acuity for viewing each image generated by the display device. For example, both the right lens and the left lens will include a focal region in the upper right corner of the lenses which is designed to optimize visual acuity for viewing the image generated by the display device located over the right lens and both the left lens and the right lens will include a focal region in the upper left corner of the lenses which is designed to optimize visual acuity for viewing the image generated by the display device located over the left lens.

In an embodiment, an eyeglass device configured for use with a near-to-eye display includes a support member and a first lens and a second lens supported by the support member. The first lens includes a first power region adjusted to a focal distance to focus an image displayed by the near-to-eye display. The second lens includes a second power region adjusted to a focal distance substantially the same as the focal distance of the first power. Preferably, the first power region of the first lens and the second power region of the second lens are located in substantially the same region of the first and second lens, respectively.

An embodiment relates to a method for optimizing the visual acuity of a wearer of prescription eyeglasses when observing an image generated by a near-to-eye display. The method includes providing an eyeglass device configured for use with the near-to-eye display. The device includes a support member; a first lens having a first power region and a second lens having a second power region supported by the support member. The power of the first power region is adjusted to a focal distance to focus an image displayed by the near-to-eye display. The power of the second power region is adjusted to a focal distance substantially the same as the focal distance of the first power. Preferably, the first power region of the first lens and the second power region of the second lens are located in substantially the same region of the first and second lens, respectively.

Figure 1:
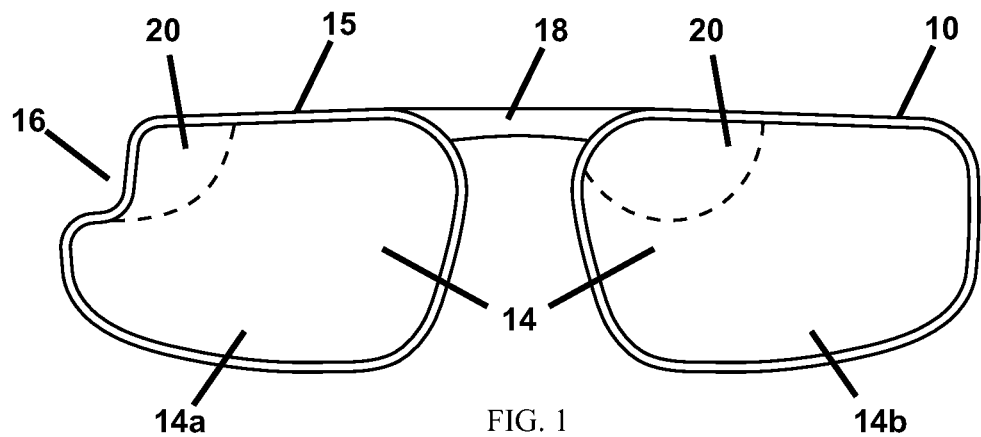
FIG. 1 is a front view illustrating a lens support with a first and second lens each having a focal region in an upper right quadrant according to an embodiment of the present invention.

Referring now to the drawings, wherein like reference numerals refer to like parts throughout, shown in FIG. 1, is a perspective view of a lens carrier 10 according to an embodiment. Lens carrier 10 includes one or more lenses 14. In addition to lenses designed or created specifically for this lens carrier, the lens 14 may be manufactured from any material that is or can be utilized in traditional eyeglasses. The lens 14 may also be a tinted lens, such as a sunlight filtering or blocking lens. The lens 14 may also be a prescription lens, including bifocals, trifocals, and numerous other types of multifocals. The lens 14 can be treated with any known coating or strengthening method, including anti-glare and anti-scratch treatment. In some embodiments, the lens 14 can be one or more of the above.

Lens 14 can be any shape that is or can be utilized in eyeglasses. For example, lens 14 can be rounded, square, oval, rectangular, or any of a variety of other shapes. Although lens 14 is illustrated primarily as rectangular with rounded corners in the figures, it should be understood that the lenses are not in any way limited to this shape. In some embodiments, the right lens and left lens are not similarly shaped. For example, as shown in FIG. 1, the right lens 14a is shaped differently from the left lens 14b. In this embodiment, lens 14a includes a notched portion 16 that can accommodate a structure or component, such as a near-to-eye device. The device may be structured as to extend into the notched portion 16. The notched portion can be a variety of shapes and sizes. Although the figures illustrate 14a with a notched portion 16, lens 14b can be designed to be notched either separately or together with lens 14a. Either or both lenses can include such a notch or other accommodating structure, for example.

The lenses 14 can be installed in one or more support members 15 designed to hold the lenses in place, such as eye wires or rims that partially or completely encircle the lenses. For example, as shown in FIG. 1, each rim 15 completely encircles each lens 14. The rim firmly holds lens 14 in place, but can be designed to allow the lenses to be interchangeable or replaced.

According to an embodiment, the rims 15 are joined by a bridge 18. Among other functions, the bridge 18 adds support and strength to the lens carrier 10. The bridge can be situated at any location along the eye rims. According to one embodiment, the bridge is as thick as the rims 15 and thus is flush with the rims 15 in the front and back. According to another embodiment, the bridge is not as thick as the rims 15, and is situated near the front, near the middle, or near the back of the thickness of the rims 15.

Figure 2:
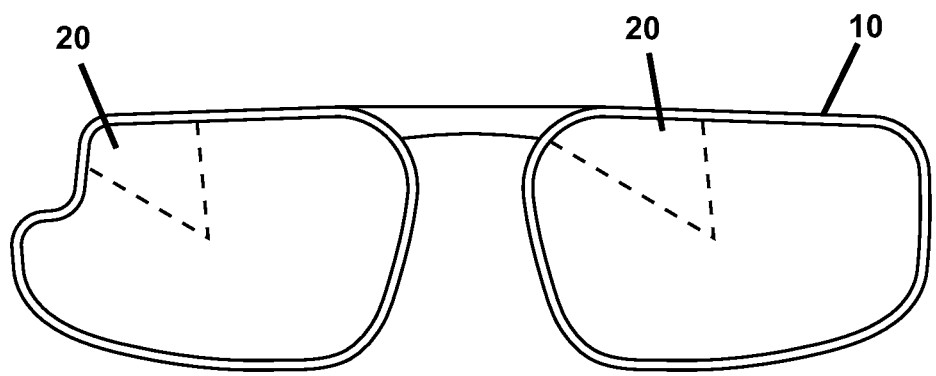
FIG. 2 is a front view illustrating a lens support with a first and second lens each having a focal region in an upper right quadrant according to an embodiment of the present invention.
Figure 3:
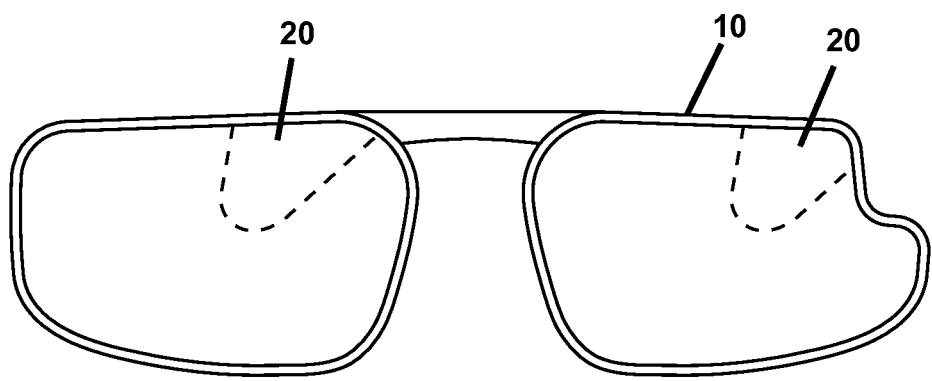
FIG. 3 is a front view illustrating a lens support with a first and second lens each having a focal region in an upper left quadrant according to an embodiment of the present invention.
Figure 4:
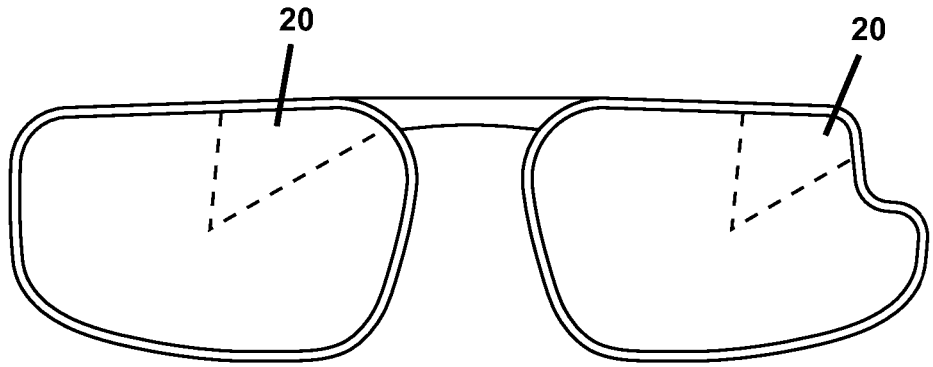
FIG. 4 is a front view illustrating a lens support with a first and second lens each having a focal region in an upper left quadrant according to an embodiment of the present invention.

In an embodiment, each of lens members 14a and 14b include a focal region 20 in an upper corner region of the lens, as shown in FIGS. 1-4 and 6. The specific shape and location of this focal region will depend at least in part on the location of the near-to-eye device, the location of the generated image, as well as the wearer's pupillary distance ("PD"), among other factors. In accordance with the present invention, the location of the focal region can be at any position about the perimeter of the lens. Preferably, as shown in FIG. 5, the focal region can be at any position about the perimeter of the lens from the 8 o'clock position clockwise through the 4 o'clock position. Preferably, the focal region is disposed in an upper quadrant of the lens. For a monocular display device located at least partially over the wearer's right lens, such as seen in FIGS. 1 and 2, both the right lens and the left lens includes a focal region 20 in the upper right corner of the lenses which is designed to optimize visual acuity for the displayed image. For a monocular display device located at least partially over the wearer's left lens, such as seen in FIGS. 3 and 4, both the left lens and the right lens will include a focal region 20 in the upper left corner of the lenses which is designed to optimize visual acuity for the displayed image. Similarly, for a binocular near-to-eye device located at least partially over both of the wearer's lenses, both the left lens and the right lens will include a focal region in the display region of the lenses, as shown in FIG. 6, which is designed to optimize visual acuity for the displayed image. As shown in the figures, the size and shape of the focus region 20 can vary considerably.

According to an embodiment, the focal region 20 in lenses 14a and 14b is designed to remove any aberrations detected by a wearer in the direction of sight toward the visualization element and image generated thereby, caused by mismatch of the left eye and the right eye in the case of the absence of the focal region in both lenses. For example, as shown in FIG. 1, if the display device is located in or near notch 16 of lens 14a, the upper corner of lens 14a near notch 16 contains a focal region 20 through which the wearer will perceive the displayed image. Lens 14b will similarly have a focal region 20 in the same corner.

The remainder of lenses 14a and 14b, however, can be similar or identical to the prescription normally utilized by the wearer. For example, the region of lenses 14a and 14b other than focal region 20 can include one or more other focal region. Accordingly, the lenses can be bifocals, trifocals, or numerous other types of multifocals. As just one example, each of lenses 14a and 14b can include focal region 20, a second focal region for viewing distance, and a third focal region for viewing near. The lenses can be progressive lenses to provide a smooth transition between regions.

According to an embodiment, the shape, size, and/or positioning of the focal region 20 in lenses 14a and 14b is variable, and is dependent at least in part on the wearer's PD. For example, if the wearer has a wide PD, then the size of focal region 20 may be smaller to avoid unwanted overlap with the wearer's pupil. For wearers with a narrower PD, the size of focal region 20 may be bigger, as shown for example in FIG. 4.

According to an embodiment, the power of focal region 20 is based at least in part on the wearer's individual prescription, in addition to the wearer's PD, the user's optical defects such as astigmatism, and/or axis of the cylindrical power. In the lens nearest the displayed image, the power of the focal region is adjusted to a very near power to allow the eye near the displayed image to focus clearly on the displayed image. Very near vision is closer to the pupil than typical near vision, which is used to view cell phones, books, newspapers and the like. Since the gaze of the far eye is parallel to the gaze of the near eye, without adjustment, the focal point of the far eye is not the same as the focal point of the near eye when the near eye is viewing the image generated by the near-to-eye device. Typically, in such a case the far eye has a further focal distance than the near eye. In accordance with the present invention, the power of the focal region of the far lens is optimized to allow the far eye to have the same focal distance as the near eye when the near eye is viewing the image generated by the device. Such optimization of the power of the focal region provides enhanced visual acuity of the generated image. Further, optimization of the power of the focal region can prevent eye strain, fatigue and headaches that may be caused by prolonged use of the near-to-eye device in combination with typical prescription lenses. Thus, the present invention provides a method and device for optimization of lens design when one eye is focused on a very near object and the other eye is not. Additionally, the power of focal region 20 may be adjusted to account for a vertical imbalance that can be caused by the necessary movement of the eye to see the image generated by the device. Accordingly, the wearer can see the image generated by the device while having optimized vision when looking straight ahead and/or for near vision. Moreover, the power of the focal region 20 may be the same or different for each lens in the lens pair. The production of optimized lenses in accordance with the present invention can be provided by processes know in the art, such as be digital lens generators, and the like.

According to another embodiment, focal region 20 can be configured to account for the size, shape, and construction of the displayed image. For example, if the displayed image is a prism, there may be a vertical prismatic effect induced when looking at the image. Accordingly, focal region 20 can be configured to compensate for the prismatic effect in order to prevent image.

Although the present invention has been described in connection with a preferred embodiment, it should be understood that modifications, alterations, and additions can be made to the invention without departing from the scope of the invention as defined by the claims.

What is claimed is:

1. An eyeglass device configured for use with a near-to-eye display device, the eyeglass device comprising:
   a first support member including a near-to-eye display device accommodating structure;
   a first prescription lens supported by the first support member, the first prescription lens including a first focal power region and one or more other focal region, the first focal power region having a first prescription power to focus a first eye of the wearer through a focal distance on an area very near the first eye, each of the one or more other focal region of the first prescription lens having a second prescription power corresponding to a prescription for a first eye of the wearer;
   a second prescription lens supported by a second support member, the second support member connected to the first support member, the second prescription lens including a second focal power region and one or more other focal region, the second focal power region having a third prescription power to focus a second eye of the wearer through a second focal distance on a second area very near the second eye, each of the one or more other focal region of the second prescription lens including a fourth prescription power corresponding to a prescription for the second eye of the wearer; and
   at least one of the first and second prescription lenses including a notched portion to accommodate the near-to-eye display device.

2. The device of claim 1, wherein the first focal power region of the first prescription lens and the second focal power region of the second prescription lens are located in substantially the same region of the first and second prescription lens, respectively.

3. The device of claim 1, wherein the first focal power region is located in an upper quadrant of the first prescription lens.

4. The device of claim 1, wherein the first prescription power and the third prescription power are equal.

5. The device of claim 1, wherein the first prescription power and the third prescription power are unequal.

6. The device of claim 1, wherein the first prescription power is determined at least in part based upon the wearer's prescription.

7. The device of claim 1, wherein the locations of the first and second focal power regions are dependent at least in part on the wearer's pupillary distance.

8. A method for utilizing prescription eyeglasses for a user to see an image generated by a near-to-eye display device, comprising:
   providing an eyeglass device configured for use with the near-to-eye display device, the eyeglass device comprising:
   a first support member including a near-to-eye display device accommodating structure;
   a second support structure;
   a first prescription lens supported by the first support member, the first prescription lens including a first focal power region and one or more other focal region, the first focal power region having a first prescription power to focus a first eye of the wearer through a first focal distance on a first area very near the first eye, each of the one or more other focal region of the first prescription lens having a second prescription power corresponding to a prescription of the first eye of the wearer;
   a second prescription lens supported by the second support member, the second prescription lens including a second focal power region and one or more other focal region, the second focal power region having a third prescription power to focus a second eye of the wearer through a second focal distance on a second area very near the second eye, each of the one or more other focal region of the second prescription lens having a fourth prescription power corresponding to a prescription of the second eye of the wearer; and
   at least one of the first and second prescription lenses including a notched portion to accommodate the near-to-eye display device.

9. The method of claim 8, further comprising locating the first focal power region and the second focal power region in substantially the same region of the first and second prescription lens, respectively.

10. The method of claim 8, wherein the first focal power region is located in an upper quadrant of the first prescription lens.

11. The method of claim 8, wherein the first prescription power and the third prescription power are equal.

12. The method of claim 8, wherein the first prescription power and the third prescription power are unequal.

13. The method of claim 8, wherein the locations of the first and second focal power regions are dependent at least in part on the wearer's pupillary distance.

14. A pair of prescription lenses adapted for use with a near-to-eye display device, the pair of lenses comprising:
   a first prescription lens comprising a first focal power region and one or more other focal region, a first power of the first focal power region having a first focal distance to focus a first eye of the wearer through the first focal distance on a first area very near the first eye, each of the one or more other focal region of the first prescription lens having a second power corresponding to a prescription of the first eye of the wearer; and
   a second prescription lens comprising a second focal power region and one or more other focal region, a third power of the second focal power region having a second focal distance to focus a second eye of the wearer through the second focal distance on a second area very near the second eye, each of the one or more other focal region of the second prescription lens having a fourth power corresponding to a prescription of the second eye of the wearer, at least one of the first and second prescription lenses including a notched portion to accommodate the near-to-eye display device.

15. The pair of lenses of claim 14, wherein the first focal power region and the third focal power region are located in substantially the same region of the first and second prescription lens, respectively.

16. The pair of lenses of claim 14, wherein the first focal power region is located in a position adjacent a perimeter of the first prescription lens entirely between an 8 o'clock position clockwise through a 4 o'clock position.

17. The pair of lenses of claim 14, wherein the first focal power and the third focal power are equal.

18. The pair of lenses of claim 14, wherein the first focal power and the third focal power are unequal.

19. The pair of lenses of claim 14, wherein the first focal power is determined at least in part based upon the wearer's prescription and at least in part on the wearer's pupillary distance.

20. The pair of lenses of claim 14, wherein the notched portion is directly adjacent the first focal power region.

* * * * *